Feb. 3, 1959 J. R. DONNAY 2,872,509

WAVE SHAPING NETWORK FOR TELEVISION EQUIPMENT

Filed March 13, 1953

INVENTOR
Jacques Donnay
By Ralph B. Stewart
attorney

United States Patent Office 2,872,509

Patented Feb. 3, 1959

2,872,509

WAVE SHAPING NETWORK FOR TELEVISION EQUIPMENT

Jacques R. Donnay, Paris, France, assignor to Société Nouvelle de l'Outillage R. B. V. et de la Radio Industrie (R. B. V.-R. I.), Paris, France, a joint-stock company Application March 13, 1953, Serial No. 342,205

6 Claims. (Cl. 178—7.1)

Figures 1, 2:
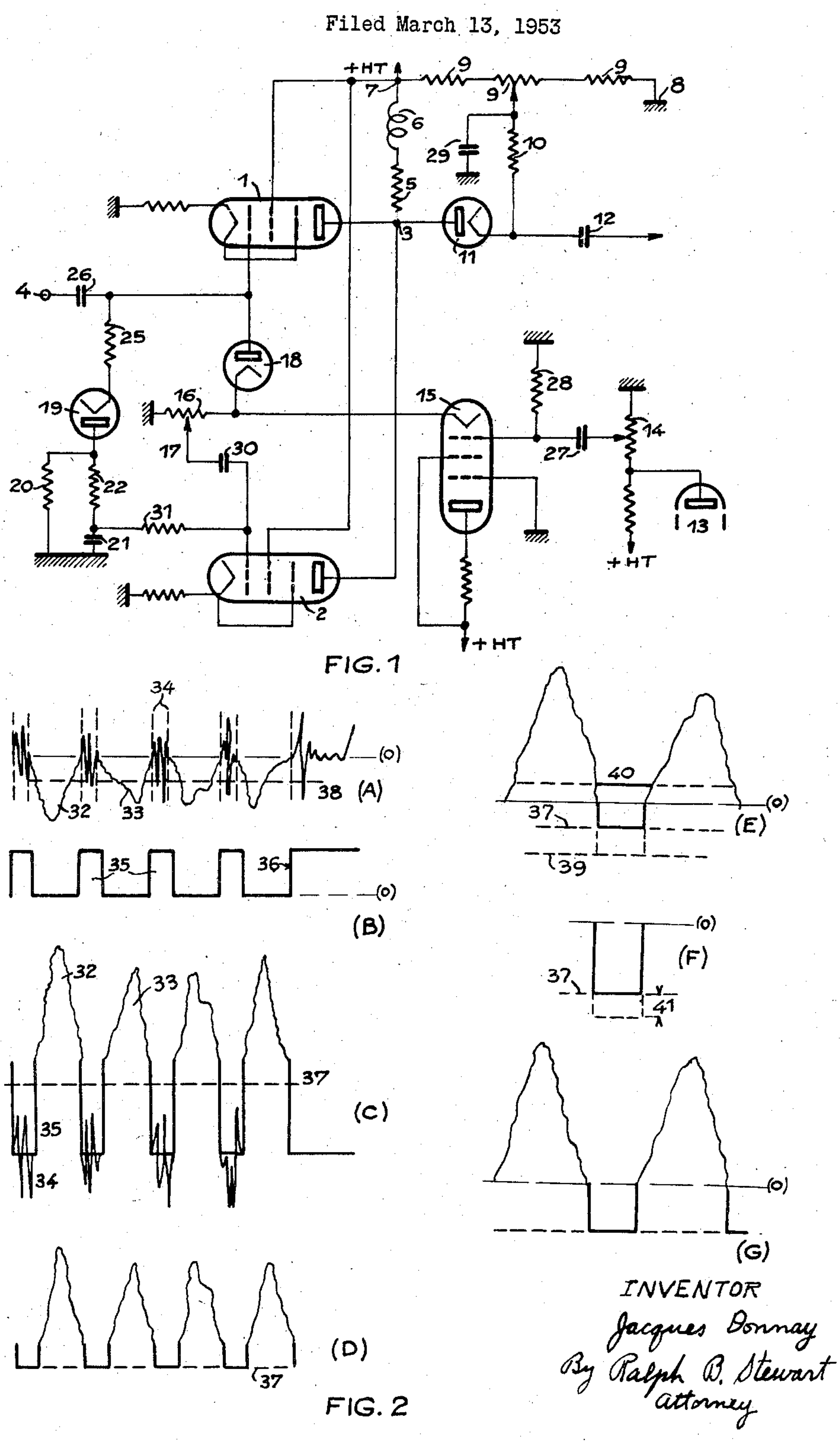

It is well known that the video signals supplied by the pick-up tube include parasitic signals during the retrace or fly-back periods of the scanning beam, which are often due to a capacitive coupling of the output circuit with the scanning coil assembly. These parasitic signals do not reproduce any picture modulation and therefore are useless; they are even obnoxious since the retrace periods are used for the transmission of the synchronising signals for the receiving tube scanning assembly. For a correct scanning of the receiver, it is essential that the intensity and shape of the synchronizing signals be independent of the video modulation. Therefore, it is necessary that these synchronizing signals be added to parts of the video signal, the level of which is constant whatever the shape of such signals.

It is usual to remove the parasitic signals from the video modulation and to put in their place pedestal signals to which the correct synchronising signals may easily be added.

Such a removal is performed by adding high intensity pulses to the modulation signals during the fly-back periods, so that the parasitic signals modulate said pulses. The intensity of the pulses is chosen according to the type of pick-up tube used in the camera, so that a limiting device can discriminate easily between the modulation signals and the parasitic ones, transmitting only the former.

As will be readily understood, the cut-off level of the limiting device will fix the lower inferior level of the modulation signal, which is used as a basis to mark the black level. It is necessary that this level should be adjustable during a transmission and that it be highly stable.

It is an object of the invention to provide a process for fixing a reference level of recurring parts of a television signal, said reference level being independent of the content of the modulating signals, but adjustable by means of a control means.

It is another object of the invention to provide means whereby the black level of a television signal may be easily adjusted.

It is another object of the invention to provide means whereby the D. C. component of a television signal is maintained throughout the various shaping stages supplying the correct signals to be transmitted from the signals delivered by an ordinary pick-up tube.

It is another object of the invention to provide means to compensate for the fluctuations of the limiting level due to the signal current flowing through the limting device.

According to the main feature of the invention, the compensation of the reference level fluctuations due to the signal current flowing through the limiting device is obtained by modulating the amplitude of the compensating signals applied to the limiting device according to the components of the video signals, the frequencies of which are less than the field frequency with such a polarity as to compensate for the fluctuations of said reference level. The D. C. component of the video signal is restored, by means of a D. C. restoration diode, during the blanking signals the amplitude of which is modulated according to the low frequency components of the video signals.

The invention will be better understood by referring to the following description and the appended drawings in which Figure 1 shows an embodiment of the invention and Figure 2 represents curves showing the voltages at different points of said circuit.

The limiting device is shown as diode 11, the anode of which receives the signals resulting from the addition of the positively polarised video signals delivered by an amplifier 1 and the negatively polarised compensating signals delivered by an amplifier stage 2. The anodes of tubes 1 and 2 are connected to the point 3 of low resistance 5; this resistance is connected to H. T. voltage terminal 7 through the inductance 6. This inductance, as it is well known, prevents voltage fluctuations caused by the signals from reaching terminal 7 of the H. T. voltage source. As shown, the cathode potential of diode 11 is fixed through a moving arm of a potential divider consisting of resistors 9 connected between the earth at 8 and the positive high voltage supply 7 of the amplifiers. The movable arm of the potential divider is connected through by-pass condenser 29 to earth, so that the high frequency voltage fluctuations due to the H. F. variations of amplitude of the diode current will be short circuited to the earth and that they will not cause corresponding variations of the cathode voltage which fixes the limiting level. Practically, the current fluctuations include very low frequency variations due to the slowly varying components of the picture signal and it is impossible to use a condenser 29 of sufficiently high capacity to eliminate these low frequency fluctuations. Therefore, the mean potential of the cathode of diode 11 varies and so does the limiting level which is fixed by the cathode to anode voltage difference of diode 11. A video signal output circuit 12 is connected to the cathode of diode 11.

According to the invention the voltage drop across diode 16 is maintained constant independently of the modulating video signals by applying to the anode of diode 11, during the fly-back periods, a potential the mean value of which varies according to the mean cathode potential during the fly-back periods.

This potential is obtained through rectification of the video signals by means of rectifier 19 connected in series with the grid leak resistor 25 to the input circuit of amplifier 1 fed with negatively polarised video signals. Across condenser 21 of the rectifier then is developed a voltage which will only reproduce the slow variations of the video current due to the integrating action of the resistor condenser network 22—21; 20 is the load resistor for the D. C. component of the rectified current and provides a discharge path for condenser 21. This slowly variable potential is applied as a negative bias voltage to amplifier 2, transmitting the blanking pulses, by means of resistor 31. This negative biasing voltage will vary slowly according to the rectified and integrated video signals, and will vary the amplitude of the compensating pulses supplied from stage 2. Since the varying biasing voltage is negative, the amplitude of the compensating pulses will decrease with increase in the biasing voltage, and vice versa. The time constant of the resistor condenser network 22—21 should be chosen along with respect to the line scanning period and it should preferably be at least equal to the field scanning period, that is to the time necessary for the electron beam to scan twice the target area of the pick-up tube in the case of an interlaced scanning of the second order.

The blanking signal for developing the compensating pulses is fed to the input circuit of amplifier 2 by means of the coupling condenser 30 and the movable arm 17 of a potentiometer 16 connected in the cathode lead of the cathode-follower stage 15. The blanking signal is derived from a stage 13 belonging to the scanning generator unit by means of the voltage dividing potentiometer 14 through a coupling condenser 27. 28 shows the usual grid leak resistor of stage 15 connected to ground. The suppressor grid of valve 15 is directly connected to earth and negative potential from cathode lead resistor 16 applied to the control grid through leak resistor 28 insures that the tube is non-conducting except during the blanking pulses. The blanking signal is applied positively polarised to the input of the stage 15 and a signal of the same polarity is to be found in the output circuit of the cathode follower stage, that is to say across load resistor 16. The blanking signal is fed from stage 15 through a low impedance path to the cathode of the D. C. setting diode 18. As will readily be understood, the video signal applied to the input of stage 1 has lost its D. C. component through coupling condenser 26, which will get charge according to the mean value of the input signal, as is well known.

Diode 18 is made non conducting during the blanking pulses due to the positive potential applied to its cathode by means of resistor 16. During the transmission of the video signals, diode 18 provides a very low impedance path for any signal which would appear as positively polarised with respect to the earth. The current which would flow through diode 18 would charge condenser 26 since stage 1 does not show grid current, up to a value such that the incoming signal shows no more positive parts. Therefore a D. C. component is restored in the video signal, the black levels corresponding to a constant bias in the linear amplifier 1 (said bias being zero) and thereby to a well defined voltage at the output of stage 1. Normally, the diode 18 is not conducting but it becomes conducting at the occurrence upon its place of positive parts of the video signal which are normally negative, this signal showing no direct current component on the control grid of tube 1. The condenser 26, when charged, shows a negative voltage which serves as a bias voltage on the control grid of tube 1. This bias voltage prevents the future positive parts of the video signal which might occur, from passing and ensures that a wholly negative video signal is appied to the grid of ampifier 1.

Curves A and B represent respectively the video signal and the blanking signals. Curve C shows the two signals added as they are applied to the anode of limiting diode 11 and curve D the signal as it is delivered to output circuit 12 from the cathode of the limiting diode 11. Fly-back periods appear as 34 on diagram A and the video modulation as 32 and 33. Line blanking signals are shown as 35, they are coincident with the fly-back periods and a little longer usually. 36 is the leading edge of a frame blanking signal. 37 shows the limiting level of diode 11, supposing that both signals include a D. C. component and that this limiting level is steady.

Actually this is not the case as has been explained before. Level 37 fluctuates with the mean value of the video signal and the cut-off of diode 11 may oscillate between limits such as 39 and 40. The amplitude of the pedestal pulses varies accordingly and a part of the modulation can even be lost when the cut-off is at level 40.

According to the invention, the amplitude of pulses 35 and 36 will vary in the same way as the limiting level 37 as shown in diagram F so that the anode-to-cathode potential difference to diode 11 is maintained constant independent of the video signal and the amplitude of the pedestals delivered to circuit 12 is necessarily steady as shown by diagram G. In Figure 2F, numeral 41 shows the range of amplitude modulation in pulses 35, 36 due to gain control of amplifier 2 by the mean video level as integrated by condenser 21.

What I claim is:

1. In a television system, the combination of a source of video signals, a source of control pulses timed to occur during the fly-back periods of said video signals, an output circuit, a limiter device for applying video signals from said source of video signals to said output circuit, means for applying control pulses to said output circuit through said limiting device, and means controlled by said video signals for varying the amplitude of the control pulses applied to said limiter device inversely in accordance with low frequency amplitude variations in said video signals.

2. In a television system, the combination of a source of video signals, a source of blanking pulses timed to occur during the fly-back periods of said video signals, an output circuit, a limiter device for applying video signals from said source of video signals to said output circuit, means including an amplifier for applying blanking pulses to said output circuit through said limiting device with a polarity opposite to that of said video signals, means for deriving from said video signals a control voltage varying in accordaance with variations in said video signals of a lower frequency than the frame frequency, and means controlling said amplifier by said control voltage for varying the amplitude of the blanking pulses applied to said limiter device inversely with variations in amplitude of said control voltage.

3. In a television system, the combination of a source of video signals, a video signal output line, a diode having an anode connected to said video signal source and a cathode connected to said output line, a biasing circuit for maintaining the cathode of said diode at an adjustable positive potential with respect to ground, an integrating network having a time constant at least as large as the picture scanning period connected to receive signal energy from said video signal source and developing a control voltage which varies according to slow variations in the amplitude of said video signal, means for applying to the anode of said diode blanking pulses timed to occur during the fly-back periods of said video signals, and means for varying the amplitude of said blanking pulses in response to said control voltage.

4. In a television system, the combination of a source of positive video signals, a video signal output line, a diode having an anode connected directly to said video signal source and a cathode connected to said output line, a biasing circuit for maintaining the cathode of said diode at an adjustable positive potential with respect to ground, an integrating network having a time constant at least as large as the picture scanning period connected to receive signal energy from said video signal source and developing a control voltage which varies according to slow variations in the amplitude of said video signal, a source of blanking pulses timed to occur during the fly-back periods of said video signals, an amplifier controlled by said source of blanking pulses and connected to apply negative blanking pulses to the anode of said diode, and means for applying said control voltage as a negative bias on the control grid of said amplifier.

5. In a television system, the combination of a source of negative video signals, a diode having an anode and a cathode, an amplifier controlled by said negative video signals and connected to supply positive video signals to the anode of said diode, a video output line connected to the cathode of said diode, a biasing circuit for maintaining the cathode of said diode at an adjustable positive potential with respect to ground, an integrating network having a time constant at least as large as the picture scanning period connected to receive signal energy from said video signal source and developing a control voltage which varies according to slow variations in the amplitude of said video signal, means for applying to the anode of said diode negative blanking pulses timed to occur during the fly-back periods of said video signals, and means for varying the amplitude of said blanking pulses inversely in accordance with variations in the amplitude of said control voltage.

6. In a television system, the combination of a source of negative video signals, a first amplifier having a control grid connected to said source through a condenser, a diode having an anode connected directly to the output of said amplifier to receive positive video signals therefrom and a cathode connected to a video signal output line, a biasing circuit for maintaining the cathode of said diode at an adjustable positive potential with respect to ground, a second diode connected between the grid of said amplifier and ground for shunting off positive video signals, a rectifier circuit connected between the grid of said amplifier and ground for rectifying said negative video signals and deriving a negative control voltage which varies in amplitude in accordance with slow variations in the amplitude of said video signals, a source of positive blanking pulses timed to occur during the flyback periods of said video signals, a connection for applying said blanking signals to the cathode of said second diode to bias said cathode positively with respect to the anode during said blanking signals, a second amplifier having a control grid connected to said source of positive blanking pulses and having an output connection to supply negative blanking pulses to the anode of said first diode, and a connection for applying said negative control voltage to the grid of said second amplifier.

References Cited in the file of this patent

UNITED STATES PATENTS

| | | |
|---|---|---|
| 2,321,343 | Wendt | June 8, 1943 |
| 2,426,710 | Sanders | Sept. 2, 1947 |
| 2,620,392 | Lax | Dec. 2, 1952 |
| 2,697,747 | Baker | Dec. 21, 1954 |

FOREIGN PATENTS

| | | |
|---|---|---|
| 732,907 | Great Britain | June 29, 1955 |